H. W. HARRISON AND G. W. FRAZIER.
PIPE RAIL FITTING.
APPLICATION FILED MAY 6, 1915.

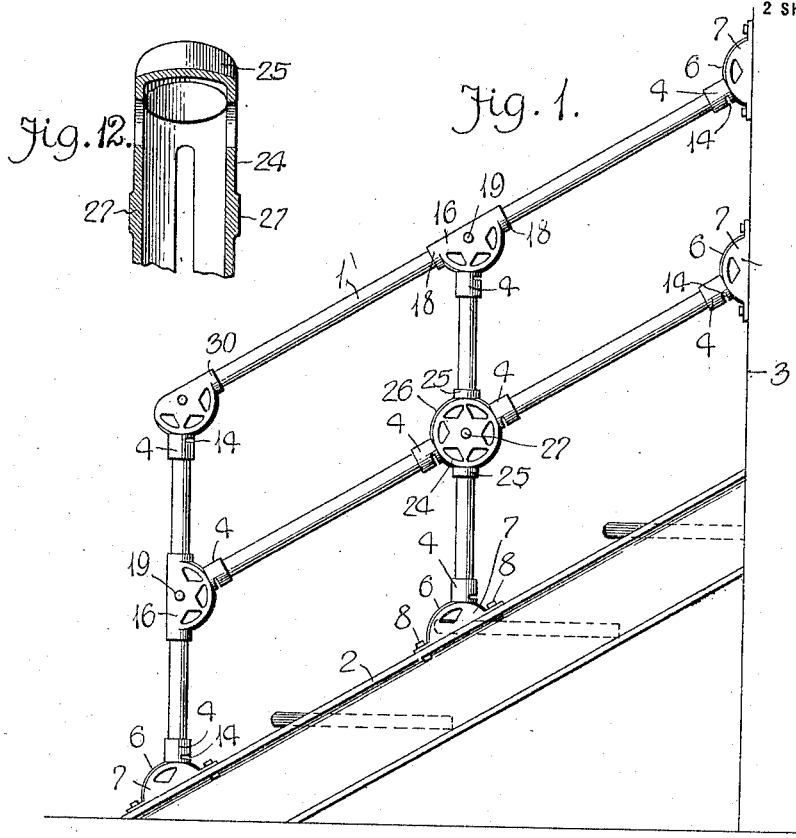
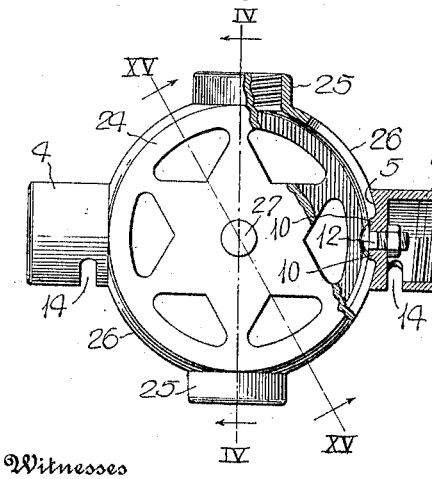
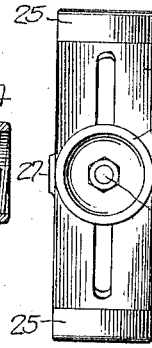
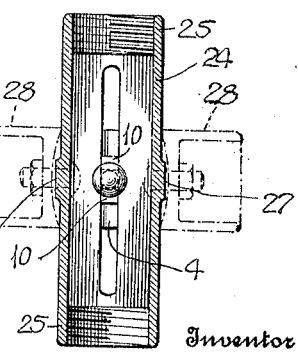

1,316,155.

Patented Sept. 16, 1919.
2 SHEETS—SHEET 2.

Witnesses
Chas. W. Stauffiger
Anna M. Dorr

Inventor
Harry W. Harrison,
George W. Frazier

By Rasthel & Rasthel
Attorneys

UNITED STATES PATENT OFFICE.

HARRY W. HARRISON AND GEORGE W. FRAZIER, OF DETROIT, MICHIGAN.

PIPE-RAIL FITTING.

1,316,155.　　　　　Specification of Letters Patent.　　Patented Sept. 16, 1919.

Application filed May 6, 1915. Serial No. 26,241.

*To all whom it may concern:*

Be it known that we, HARRY W. HARRISON and GEORGE W. FRAZIER, citizens of the United States of America, residing at Detroit, in the county of Wayne and State of Michigan, have invented certain new and useful Improvements in Pipe-Rail Fittings, of which the following is a specification, reference being had therein to the accompanying drawings.

In setting up pipe railing for balustrades, light trusses or the like, wherein short sections of pipe are connected at their ends to form the posts, rails and intermediate diagonals or base members, any variation in the angles between the pipe sections from those of standard pipe fittings, necessitates the use of special fittings which must be designed especially for each particular piece of work. This entails expense and impairs the ease with which the parts can be assembled as any variation in the machining of the parts must be overcome by hand fitting when the railing is being erected.

This invention relates to pipe railings or the like and to an arrangement of the members that couples the pipe sections together whereby such fittings are available in a great variety of places and can be made up in stock, adaptable for use as desired.

The invention consists in the matters hereinafter set forth, and more particularly pointed out in the appended claims.

In the drawings,

Figure 1 is a view in side elevation of a pipe railing for a stairway embodying features of the invention;

Fig. 2 is a view in detail of a four-way T coupling;

Fig. 3 is a view in side elevation thereof;

Fig. 4 is a view in detail taken on line IV—IV of Fig. 2, with cross fittings added and indicated in dotted lines;

Fig. 12 is a view in detail taken on or about line XV—XV of Fig. 2.

Figure 9:
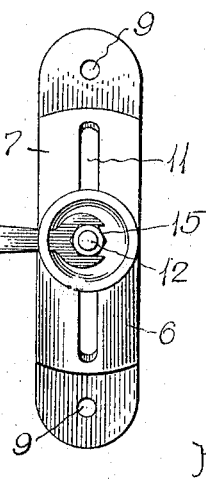

Referring to the drawings, the several pipe sections 1 which form the rail and post of a balustrade such as indicated in Fig. 1, for example, have the end portions adjacent the stairs, indicated at 2, and the wall indicated by the line 3, inserted into screwthreaded fittings 4. A head 5 on the outer end of each of these fittings is slightly concaved to bear firmly against the transversely convex segmental face 6 of a foot 7 that is adapted to be secured as by bolts 8 or the like passing through apertures 9 in the end portions thereof, to a stair, girder or wall. Guide lugs 10 on the fitting 4 travel in a longitudinal slot 11 of the foot, the parts being held in adjusted angular engagement by a bolt 12 passing through the slot 11 and an opening 13 in the head 5. A lateral opening or slot 14 permits the application of a wrench, as indicated for example in Fig. 9, for tightening the bolt nut 15 and thereby holding the parts adjusted. The center of curvature of the segmental face 6 is coincident with the axis of the applied member 4 so that the latter is always radial to the fitting.

Figure 5:
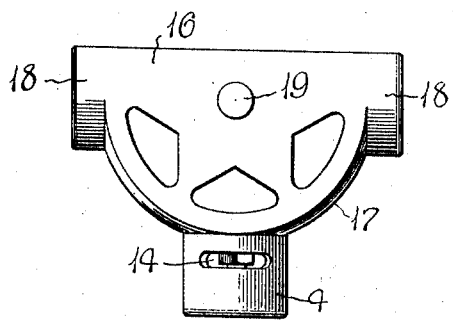
Fig. 5 is a view in detail of a post head.
Figure 6:
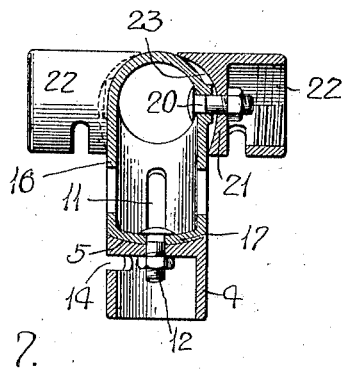
Fig. 6 is a view in detail, taken in longitudinal section, of a post head with cross rail fittings attached.
Figure 10:
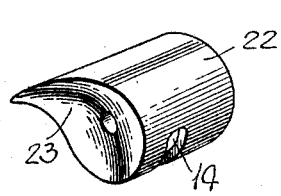
Fig. 10 is a view in detail of a cross rail nipple for a hand rail.

At the junction of the hand rail sections with a post top, an intermediate hand rail fitting 16 is used that has a segmental slotted face 17 corresponding to the face 6 of the foot piece on which another member 4 is applied as in the foot piece. Tubular sockets 18 at each end of this hand rail piece form connections for the hand rail sections, the axes of which together with the axis of the fitting 4 pass through the center of curvature of the face 17. Alined lateral bosses 19 on this fitting whose axes are perpendicular to the other fitting axes at the point of intersection thereof provide for the introduction therethrough of suitable bolts 20 that pass through the heads 21 of cross T fittings 22 having concaved faces 23 as indicated in Fig. 2, whereby cross hand rails may be coupled as indicated in Fig. 6.

A similar fitting to the one just described is also used at the end post intermediate the ends thereof as indicated in Fig. 1.

Where it is desired to couple an intermediate rail with a post, a post fitting 24 such as indicated in Fig. 2 may be used. A pair of alined lateral lugs 25 on such fitting receive the post sections, while oppositely disposed fittings 4 adjustable on oppositely disposed segmental faces 26 in the same way as on the foot and rail fittings, permit the application of the intermediate rail sections. Central bosses 27 likewise admit of a cross intermediate rail being applied and in such instance a connection is formed as indicated in dotted lines in Fig. 4, the parts 28 indicating the nipples.

In the case of this fitting 24, and of the rail fitting 16, the construction admits of thrusting a single section of pipe through both nipples instead of attaching the sections.

Figure 7:
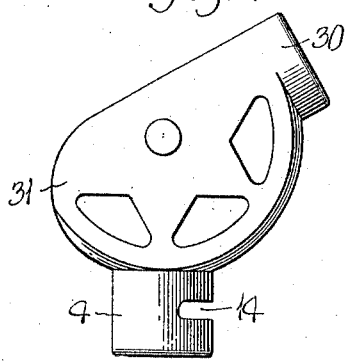
Fig. 7 is a view in detail of a rail and fitting.
Figure 11:
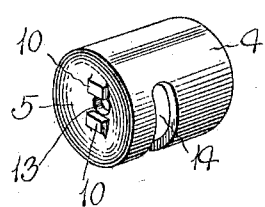
Fig. 11 is a view in detail of another cross rail supply.
Figure 8:
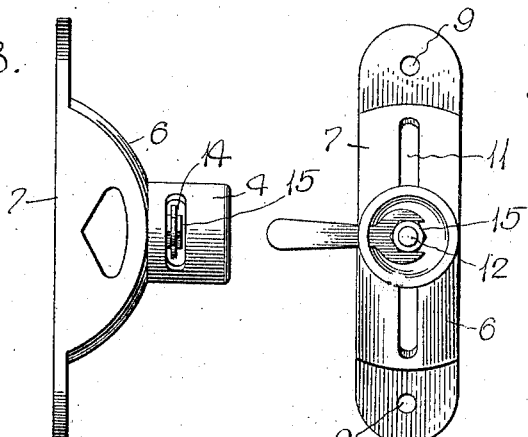
Figs. 8 and 9 are views in details of a post or rail foot.

For finishing the end rail of a banister, the end post connection indicated in Fig. 7 having a single fixed nipple 30 and a rounded, finished, closed end portion 31 may be used. By the application of two of the members 4 to the hand rail intermediate fitting a diagonally braced truss may be readily formed as shown in Fig. 12. Obviously cross members could be inserted if desired.

As a result, fittings of this character may be used to assemble railings of this kind in almost any place in which such rails can be used, the fittings readily permitting the alinement of the parts without special designing or machining, the whole being assembled with the use of ordinary hand tools. The fittings become of special value in placing guard rails around the foot walks and ladders of machinery in the engine room of boats or the like.

Obviously, changes in the details of construction may be made without departing from the spirit of the invention and we do not care to limit ourselves to any particular form or arrangement of parts.

What we claim is:—

1. A pipe rail fitting comprising a casing having alining nipples and a convex wall between said nipples, said wall having a longitudinal slot, an adjustable nipple on the convex wall of said casing, and individual fastening means for said nipple extending through the slot of said wall adapted to hold said adjustable nipple in engagement therewith, said adjustable nipple having a transverse slot at the inner end thereof to facilitate adjusting said nipple fastening means.

2. A pipe rail fitting consisting of a hollow circular casing with a pair of radially disposed nipples integrally formed thereon and with slots circumferentially disposed between the fixed nipples, and holding nipples abutting radially against the circular wall and having lugs centrally of the end walls thereof non-rotatively engaging in the slots, together with clamping bolts extending through said lugs for securing the parts in adjusted relation.

In testimony whereof we affix our signatures in presence of two witnesses.

HARRY W. HARRISON.
GEORGE W. FRAZIER.

Witnesses:
C. R. Stickney,
Anna M. Dorr.

Copies of this patent may be obtained for five cents each, by addressing the "Commissioner of Patents, Washington, D. C."